United States Patent Office 3,590,028
Patented June 29, 1971

3,590,028
ADRIAMYCIN DERIVATIVES
Federico Arcamone, Milan, Giuseppe Cassinelli, Rivanazzano, Pavia, and Aurelio di Marco and Marcello Gaetani, Milan, Italy, assignors to Società Farmaceutici Italia, Milan, Italy
No Drawing. Filed Apr. 18, 1968, Ser. No. 722,221
Claims priority, application Italy, Apr. 18, 1967, 15,056/67
Int. Cl. C07c 47/18, 95/04
U.S. Cl. 260—210
7 Claims

ABSTRACT OF THE DISCLOSURE

Described is the antibiotic "adriamycin" and its derivatives. "Adriamycin" has the formula

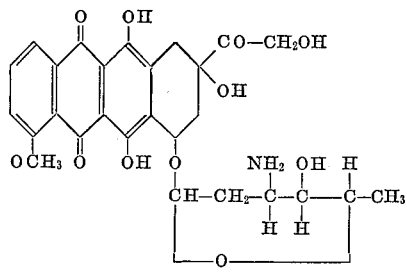

and is prepared by aerobic fermentation of mutant F.I. 106 of *Streptomyces peucetius*. The compounds show antitumoral activity on some mouse and rat tumors.

---

Our invention relates to a new antibiotic substance and its derivatives which are particularly useful in therapy as antitumoral products and to a process for the preparation thereof. More particularly our invention has as its object a new antibiotic of the indicator type, which we call "adriamycin" or antibiotic "B-106 F.I.," its salts, its hydrolytic degradation products, and a biosynthesis process for the preparation thereof by the use of a new microorganism. The new microorganism used in the process of the present invention has been obtained by mutageneous treatment of *Streptomyces peucetius* described in British Pat. 1,003,383, U.S. patent application Ser. No. 404,550 and in the Giorn. Microbiol. vol. 11, 1963, pp. 109–118. The new strain thus obtained has been given the code F.I. 106 of the Farmitalia microbiological collection and has been called *Streptomyces peucetius* var. *caesius*.

*S. peucetius* var. *caesius* has been deposited at the Institute of Microbiology of the Rutger University (U.S.A.) receiving the index number I.M.R.U. 3920 and at the Institute of Plant Pathology of the University of Milan (Italy) receiving the index number I.P.V. 1946.

The new microorganism has the following microscopic, macroscopic and biochemical properties:

MICROSCOPIC PROPERTIES

The vegetative mycelium on the usual culture media shows thin hyphae (0.5–0.9μ thick) more or less long and branched. The ramifications form thicker hyphae (1.1–1.6μ thick), the conidiophores are often collected in fasciculated forms ending in hooks. The conidia are spherical with a diameter between 1.8 and 3.3μ, first disposed in little chains, then free. Under the electronic microscope, the conidia appear nearly spherical, of irregula contours with a warty surface.

MACROSCOPIC PROPERTIES

In Table 1 are given the cultural properties noticed on the indicated media, in which the microorganism is grown at 28° C. observations being made at the 3rd, 8th, 15th, 21st and 30th day after inoculation.

BIOCHEMICAL PROPERTIES

Gelatin: slow and partial hydrolysis
Nitrates: no reduction to nitrites
Production of hydrogen sulfide: positive
Milk: no peptonization; no coagulation
Starch: very slow and slight hydrolysis
Maltose, xylose, mannose, mannitol, glycerol, glucose, saccharose, trehalose, raffinose, fructose are utilized.
Lactose, adonitol, ramnose, sorbitol, arabinose, esculine and mesoinositol are not utilized.
Antibiotics: in liquid submerged culture it produces substances having antibiotic and antitumoral activity.

CLASSIFICATION OF THE MUTANT F.I. 106

The mutant F.I. 106 has the following taxonomic position. In the classification system of Pridham et al. (Appl. Microbiol. 6, p. 52 1958) the microorganism belongs to the section *Retinaculum apertum*, series Red. In the classification system of Baldacci (Giorn. Microbiol. 6, p. 10, 1958) the microorganism belongs to the series *Albosporeus*; and in the system of Waksman (The Actinomycetes, Vol. II, p. 129, 1961) the microorganism belongs to the series Ruber. A comparison between the characteristics of the microorganism F.I. 106 and those of the species belonging to the cited systematic groups (Taxa) has shown that none of the latter has characteristics corresponding to those of F.I. 106.

In Table II are given these comparison data concerning the species producing substances similar to those studied. In this table, *S. cinereoruber*, *S. cinereoruber* var. *fructofermentans*, *S. caespitosus* and *S. antibioticus* have also been included even though they are not part of the above cited Taxa. There is also a list of the differences from the species which do not produce substances of the studied type.

Our microorganism differs from the species *S. albosporeus* (Waksman: The Actinomycetes, Vol. II, p. 171, 1961) because the latter does not produce soluble pigments, reduces nitrates and does not produce $H_2S$; from *S. cinnamomensis* (Waksman: The Actinomycetes, Vol. II, p. 195, 1961) and from *S. fradiae* (Waksman: The Actinomycetes, Vol. II, p. 211, 1961) in the color of the vegetative mycelium and aerial mycelium; from the species *S. ruber* (Waksman: The Actinomycetes, Vol. II, p. 271, 1961) because the latter coagulates the milk, does not produce soluble pigments and does not produce $H_2S$; from *S. rubescens* (Waksman: The Actinomycetes, Vol. II, p. 271, 1961) in the color of the aerial mycelium and because *S. rubescens* does not form any soluble pigments and does not produce hydrogen sulfide; from *S. oidiosporus* (Waksman; The Actinomycetes, Vol. II, p. 251, 1961) because the latter dotes not reduce nitrates and does not peptonize milk. Moreover, *S. oidiosporus* does not produce soluble pigments.

It is concluded that the mutant F.I. 106 of *S. peucetius* is different from all the species producing similar substances and more generally, it is different from all the species belonging to the systematic subgeneric groups to which the strain itself belongs. Particularly, the strain F.I. 106 differs from the parent strain *S. peucetius* which produces daunomycin (British Pat. 1,003,383) because it forms a vegetative mycelium more intensely red colored, an aerial mycelium which sometimes assumes blue-green turquoise tonality and lastly because it produces the antibiotic adriamycin.

TABLE I

Cultural properties of the mutant F.I. 106 of *S. peucetius*

| Medium | Growth | Aerial mycelium | Vegetative mycelium | Soluble pigments |
|---|---|---|---|---|
| Agar malt yeast extract (according to Hesseltine et al. 1954).[1] | Little confluent colonies with wrinkled folds, hard, relieved, abundant. | Very scanty, smooth pale pink colored, absence of spirals and verticils. | Abundant, yellowish then yellow-reddish. | Intense, first yellow-red then brown-red. |
| Bennet agar | Scanty, single yellowish little colonies. | Absent | Scanty, first yellowish then orange. | Absent. |
| Emerson agar | Moderate, little confluent colonies. | do | Moderate, first pale pink then reddish. | Reddish-clear brown. |
| Agar potato (according to Hesseltine et. al 1954).[1] | Abundant in smooth regular patina. | Abundant, first pink, then attenuate blue-green turquoise hook-ended and then ball-ended hyphae. | Abundant, flesh colored. Hard smooth patina. | Intense, first yellow-reddish then from strong orange to light red. |
| Agar peptone plus potassium nitrate. | Abundant, in confluent little colonies. | Absent | Abundant, colorless | Absent. |
| Agar Czapeck | Abundant in confluent little colonies. | Scanty, first dirty white then attenuate blue-green turquoise, slightly cottony hook-ended or ball-ended hyphae. | Abundant, pale pink colored. | Do. |
| Asparagine glucose agar | Scanty, in isolated little colonies. | Scanty, whitish rose. Very broken mycelium short without apical hooks. | Scanty, colorless | Do. |
| Glycerine-glycine agar | Abundant, in smooth, hard patina. | Absent | Abundant, from yellow to orange. | Do. |
| Starch agar | Scanty, in single little colonies. | do | Scanty, colorless then yellowish rose. | Do. |
| Gelatin | Moderate, in surface | do | Moderate, from colourless to yellowish. | Abundant, brown dark black. |
| Milk | Scanty | do | Scanty, ring formed surface pink-salmon colored. | Scanty, pink. |

[1] Hesseltine et al.: Ann. N.Y. Acad. Sci., 1954, 60, pp. 136-151.

TABLE II

Comparison between the mutant F.I. 106 of *S. peucetius* and species producing substances similar to the antibiotic adriamycin

| | Mutant F.I. 106 | S. purpurescens | S. bobiliae | S. cienereo ruber | S. ceruleo rubidus |
|---|---|---|---|---|---|
| Sporophores | Straight or hooked-like | Spirally | Spirally | Straight or hooked-like | Biverticilly spirally. |
| Spores | Nearly round, warty, 1.8×3.3μ. | Oval, spiny, 0.8-1μ per 0.4-0.5μ | | Oval, smooth, 0.7-1μ per 0.9-2μ. | Oval, spiny, 0.6-0.9×0.8-1.2μ. |
| Vegetative mycelium | From yellow-red to intense red. | Red | Coral-red | Yellow-red brown | Yellow-red brown. |
| Aerial mycelium | White-rose, sometimes attenuate blue-green turquoise. | White-rose | White | Ash-grey | Blue turquoise. |
| Reduction of: | | | | | |
| Nitrates | − | / | + | / | /. |
| Milk (pep. coag.) | − | − | + | + | /. |
| L-xylose | + | + | + | + | +. |
| L-arabinose | − | + | + | + | +. |
| L-ramnose | − | + | + | − | +. |
| Fructose | + | + | + | − | +. |
| Saccharose | + | + | + | + | +. |
| Lactose | − | + | + | − | +. |
| Raffinose | − | + | + | − | +. |
| D-mannite | + | + | − | − | +. |
| D-sorbite | − | − | − | − | +. |
| Produced antibiotics | Adriamycin | Rodomycin | Cynerubin | Rodomycin | Rubidomycin. |

| | S. cinereo ruber var. fructofermentans | S. caespitosus | S. niveoruber | S. galilaeus | S. nogalater var. nogalater |
|---|---|---|---|---|---|
| Sporophores | Straight or hooked-like | Verticilly | Spirally | Spirally | Straight or hooked-like. |
| Spores | Oval, smooth, 0.7-1μ per 0.9-2μ. | Oval, smooth, 0.5-1.5μ per 0.3-0.5μ. | Smooth | Smooth | More or less spherical, smooth. |
| Vegetative mycelium | Yellow-red brown | From cream to brown to yellow-reddish. | Carmine-red | Carmine-red | Orange-red. |
| Aerial mycelium | Ash-grey | White yellowish grey | Whitish | From white to ash-grey | Grey. |
| Reduction of: | | | | | |
| Nitrates | / | + | / | / | −. |
| Milk (pep. coag.) | + | + | − | + | +. |
| L-xylose | + | − | / | / | +. |
| L-arabinose | + | − | / | / | +. |
| L-ramnose | + | − | / | / | +. |
| Fructose | + | + | / | / | +. |
| Saccharose | + | + | / | / | −. |
| Lactose | + | / | / | / | +. |
| Raffinose | − | − | / | / | +. |
| D-mannite | + | − | / | / | +. |
| D-sorbite | + | + | / | / | +. |
| Produced antibiotics | Cynerubin | Mithomycin | Cynerubin | Cynerubin | Nogalamycin. |

| | S. antibioticus | S.a. 1165 | S.a. 220 | S. doa 1205 |
|---|---|---|---|---|
| Sporophores | Straight | Not described | Not described | Made as spirals. |
| Spores | Smooth, spheric | do | do | Not described. |
| Vegetative mycelium | Yellow-cream | do | do | Brick-red vinous-red. |
| Aerial mycelium | From white to mouse grey | do | do | Red-grey. |
| Reduction of: | | | | |
| Nitrates | / | / | / | /. |
| Milk (pep. coag.) | + | / | / | +. |
| L-xylose | / | / | / | /. |
| L-arabinose | / | / | / | /. |
| L-ramnose | / | / | / | /. |
| Fructose | / | / | / | /. |
| Saccharose | / | / | / | /. |
| Lactose | / | / | / | /. |
| Raffinose | / | / | / | /. |
| D-mannite | / | / | / | /. |
| D-sorbite | / | / | / | /. |
| Produced antibiotics | Cynerubin | Aklavin | Rutilantin | Pyrromycin. |

+ = positive reaction.
− = negative reaction.
For *S.a.* 1165 and *S.a.* 220 see Asheshov et al. Antibiotics and Chemotherapy, 1954, 4, 380
For *S. doa* 1205 see Brockmann, Chem. Ber., 1959, 92, 1880.
/ = data are lacking.

The mutant F.I. 106 may be stored by lyophilization using as suspending medium milk or milk serum, or by collecting and maintaining the spores in a sterile substrate. It may also be stored by successive cultivations on a solid medium containing glucose or another suitable sugar and complex substances containing nitrogen (yeast extract, peptone, or hydrolyzed casein). The medium may besides contain some salts among which magnesium sulphate and potassium phosphate are particularly important.

The production of the antibiotic is carried out by usual and well know methods and consists in cultering the mutant F.I. 106, in a previously sterilized liquid cultural medium under aerobic conditions at from 25° to 37° C. (preferably at 28° C.) over a period from 3 to 7 days (preferably 5 days) at a pH which initially is from 6.5 to 7.0 and at the end of the fermentative process is of from 7.5 to 8.0. The cultural medium consists of a carbon and a nitrogen source and mineral salts. The carbon source may for example be starch, dextrin, glucose, glycerin, mannite, maltose, corn steep liquor, distillers solubles, soyabean oil or soyabean meal. The nitrogen source besides the above mentioned complex substances containing nitrogen may be for example dry yeast, meat peptone, or casein. Good results are even obtained by using ammonium salts such as ammonium nitrates, ammonium sulphates, diammonium phosphates. The mineral salts useful for the production of the antibiotic may vary according to the medium employed. In a medium containing complex substances such as various meals and fermentation residues, the addition of calcium carbonate and sodium or potassium phosphates have proved useful. In media containing glucose, yeast or ammonium salts, much higher additions of mineral salts such as potassium, magnesium, iron, zinc, manganese, copper and salts are necessary. The fermentation may be carried out in Erlenmeyer flasks or in laboratory or industrial fermenters of various capacity. The quantity of adriamycin present in the broths may be evaluated by the following method. The culture is filtered with the help of 2% Hyflo Supercel (registered trademark). The broth filtered is adjusted to pH 8.6 with 1 N sodium hydroxide solution, and is extracted twice with a 9:1 chloroform-methanol mixture. The extract is washed with water, then concentrated to dryness in vacuo. The residue is taken up with methyl alcohol and then chromatographed over whatman MM No. 3 paper buffered with M/15 phosphate buffer at pH 5.4, employing as an eluant a 7:1:2 propanol-ethyl acetate-water mixture. The red-colored part corresponding to Rf of adriamycin is eluted with a 9:1 methanol-water mixture and the quantity of adriamycin present in the filtered broth is evaluated by spectrophotometrically checking a sample of the eluate at the wavelength of 495 m$\mu$ and compared with a sample of adriamycin of which the titer is known.

The quantity of adriamycin present in the mycelium is evaluated in the following manner. The mycelium is extracted with a 4:1 acetone-0.1 N sulphuric acid mixture. The extract is neutralized and concentrated under reduced pressure to ⅕ of the original volume. The concentrate is adjusted to pH 8.6 with 1 N sodium hydroxide solution, then extracted twice with a 9:1 chloroform-methanol mixture. The extract is washed with water, then concentrated to dryness in vacuo. The content of adriamycin is determined on a sample of the residue, using the same method as described above.

In order to isolate adriamycin, the antibiotic may be extracted with a suitable solvent either from the culture broth "in toto" without filtering the mycelium mass or from the mycelium and the culture liquid previously separated by filtration. When carrying out the extraction separately, it is preferred to operate as follows. At the end of the fermentation, an adsorbent siliceous material, such as Supercel, is added to the culture broth. The mixture is filtered and both the filtration cake and the filtrate are treated separately. Most of the antibiotic is found in the filtration cake which consists of the mycelium mixed with the adsorbent siliceous materials. This cake is pulped and stirred in an organic solvent. Suitable solvents are alcohols, such as methanol, ethanol, butanol, ketones such as acetone, methylethylketone; halogenated hydrocarbons such as chloroform, methylene chloride or aqueous solutions of organic or inorganic acids; such as acetic acid, hydrochloric acid, sulphuric acid. Advantageously, mixtures of organic solvents, such as alcohols and water-miscible ketones and aqueous solutions of inorganic acids may be used. Generally a mixture of acetone/0.1 N sulphuric acid in a ratio of from 7:1 to 3:1, preferably 4:1, is employed.

From the filtered broth, previously made alkaline to pH 8.5–9.0, the antibiotic may be extracted with water-immiscible organic solvents of the group of alcohols, ketones and halogenated lower aliphatic hydrocarbons such as amyl alcohol, butyl alcohol, methyl-isobutyl-ketone, methylene chloride, chloroform and mixtures thereof. Another method of extracting the filtered broth is to pass the broth itself through chromatographic column containing cationic carboxylic exchange resin (Amberlite IR 50 type) in acid form and eluting the product with an aqueous methanol solution of sodium chloride.

The organic extracts of the broth and of the mycelium are collected, neutralized, mixed with water, then concentrated under reduced pressure. The aqueous concentrate is adjusted to pH 3 with 1 N hydrochloric acid, then extracted with chloroform. The extract containing various impurities is removed while the aqueous layer is adjusted to pH 8.5–9.0 and extracted with a 9:1 chloroform-methanol mixture. The extract is washed with water, dried over anhydrous sodium sulphate, then concentrated to small volume under reduced pressure. From the concentrate, on addition of ethyl ether, a crude product containing as principal component adriamycin as a free base is obtained.

In order to purify adriamycin from various water- and lipo-soluble pigments countercurrent distribution or column chromatography may be used. In the first case, a 2:2:1 chloroform-methanol M/15 phosphate buffer mixture at pH 5.4 may be used. Better results are obtained employing chromatography over a column of cellulose buffered with a phosphate at pH 5.4 and using as eluting agent a propanol-ethyl acetate-water (7:1:2) mixture. The fractions containing adriamycin are collected and concentrated after addition of water. The aqueous concentrate is adjusted to pH 8.6 with 1 N sodium carbonate, then extracted with chloroform. The chloroform solution is dried over anhydrous sodium sulphate and then concentrated to a small volume. By adding anhydrous methanol containing hydrochloric acid, adriamycin hydrochloride is obtained as orange-red colored thin needles, which on recrystallization from anhydrous ethyl alcohol, yields orange-red needles melting at 204–205° C. (with decomposition). It is optically active $[\alpha]_D^{23°} = +248° \pm 2°$ (c.=0.1 in methanol).

Elemental analysis of a purified adriamycin hydrochloride sample gives the following (percent): C=54.36, H=5.43, N=2.37, Cl=6.42.

The empirical formula corresponds to $C_{27}H_{29}NO_{11} \cdot HCl$ and the molecular weight is 579.98. The adriamycin hydrochloride is soluble in water, methanol and aqueous alcohols but is insoluble in acetone, benzene, chloroform, ethyl ether and petroleum ether. The alcoholic solutions of the antibiotic give characteristic coloring with metallic salts: crimson red with magnesium salts, crimson red with calcium salts, and dark red with lead salts. At an alkaline pH, a turning point to violet color and precipitation of pigmented substances is observed. Aqueous solutions of adriamycin hydrochloride are yellow-orange at acid pH, red-orange at a neutral pH and violet-blue at a pH higher than 9. The spectrum in U.V.

and in the visible ranges in methanol is characterized by the following maxima:

at 233 mµ ($E_{1\ cm.}^{1\%}$=673)
at 252 mµ ($E_{1\ cm.}^{1\%}$=450)
at 288 mµ ($E_{1\ cm.}^{1\%}$=159)
at 479 mµ ($E_{1\ cm.}^{1\%}$=219)
at 496 mµ ($E_{1\ cm.}^{1\%}$=217)
at 529 mµ ($E_{1\ cm.}^{1\%}$=118)

In the I.R. spectrum bands of the following wavelengths are noted: (in µ): 3.00, 3.44, 5.80, 6.17, 6.31, 6.55, 7.05, 7.78, 8.11, 8.24, 9.00, 9.35, 10.10, 10.98, 11.50, 12.68, 13.12, 14.60. Adriamycin has the following structural Formula I:

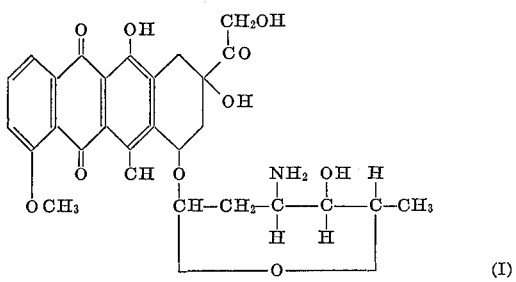

The antibiotic is a base to form salts with inorganic and organic acids. The color change observed from red to blue-violet at pH ~9 is due to the salification of the phenolic hydroxyl-groups. Acids split the glycosidic bond. For example, heating adriamycin to 100° C. in 0.5 N mineral acids for one hour, gives a red-colored aglycone, insoluble in water (adriamycinone) and a water-soluble, basic, reducing fraction (daunosamine). Adriamycinone has the following structural Formula II:

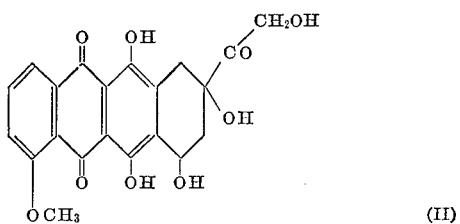

the corresponding empirical formula is $C_{21}H_{18}O_9$. It melts at 223–224° C.; $[\alpha]_D$=+156° (c.=0.1 in dioxane).

The spectrum in the U.V. and in the visible ranges shows maxima at the following wavelengths:

| $\lambda_{max.}$ (mµ): | $E_{1\ cm.}^{1\%}$ |
|---|---|
| 233 | 887 |
| 251 | 631 |
| 288 | 211 |
| 478 | 282 |
| 495 | 290 |
| 528 | 173 |

In the I.R. spectrum, the following absorption bands are noted (in µ): 2.90, 3.42, 5.79, 6.18, 6.34, 6.92, 7.08, 7.26, 7.42, 7.80, 7.90, 8.05, 8.29, 8.43, 8.72, 8.93, 9.30, 9.88, 10.10, 10.86, 12.32, 12.75, 13.16, 13.70, 14.40. The mass spectrum of adriamycinone shows the following tops: m/e 414 (M), 378 (M–2H$_2$O), 347 (M–2H$_2$O–CH$_2$OH).

The pentaacetate of adriamycinone (prepared by treatment of adriamycinone with acetic anhydride and pyridine) has the empirical formula $C_{31}H_{28}O_{14}$, melting at 164–166° C.; $[\alpha]_D$=–94° (c.=0.1 chloroform) and shows the following mass spectrum: m/e 624 (M), 582 (M–CH$_2$CO), 540 (M–2CH$_2$CO), 480 (M–2CH$_2$CO–CH$_3$COOH), 420 (M–2CH$_2$CO–2CH$_3$COOH), 378 (M–3CH$_2$CO – 2CH$_3$COOH), 347 (M – 3CH$_2$CO – 2CH$_3$COOH–CH$_2$OH).

The water-soluble fraction (daunosamine) consists of a reducing aminosugar having the following structure III:

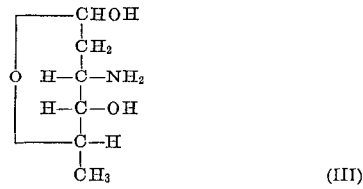

Daunosamine hydrochloride melts at 168° C. (with decomposition); $[\alpha]_D$=–54.5° (in water); N-benzoylderivative melts at 154–156° C.

Chromatography of adriamycin hydrochloride and its aglycone in comparison with daunomycin and daunomycinone Paper chromatography.—Whatman paper No. 1 buffered with M/15 phosphate buffer at pH 5.4, descending development for 16 hours at room temperature.

Solvent A: Butanol saturated with M/15 phosphate buffer at pH 5.4;
Solvent B: Propanol ethyl acetate water (7:1:2).

Thin layer chromatography. — Kieselgel G layer (Merck) buffered with 1% oxalic acid in water. The chromatogram was run at 10 cm. at room temperature.

System C: methylene chloride methanol (100:15);
System D: n-butanol-acetic acid-water (4:1:5) upper phase;
System E: benzene-ethyl acetate petroleum ether boiling at 80–120° C. (80:50:20);
System F: benzole-ethyl formate-formic acid (50:50:1).

| | Chromatography on— | | | | | |
|---|---|---|---|---|---|---|
| | Paper | | | Thin layer | | |
| System | A | B | C | D | E | F |
| Compound: | | | | | | |
| Adriamycin Rf | 0.10 | 0.25 | 0.17 | 0.33 | 0.00 | 0.00 |
| Daunomycin hydrochloride Rf | 0.20 | 0.50 | 0.35 | 0.40 | 0.00 | 0.00 |
| Aglycone of adriamycin (Adriamycinone) Rf | 0.30 | 0.65 | 0.90 | 0.80 | 0.10 | 0.25 |
| Daunomycinone Rf | 0.75 | 0.85 | 0.95 | 0.85 | 0.15 | 0.40 |

The acid addition salts of adriamycin are obtained by reacting the base with non-toxic organic and inorganic acids, such as hydrochloric acid, sulphuric acid, acetic acid, propionic acid, valerianic acid, palmitic acid, oleic acid, citric acid, succinic acid, mandelic acid, glutamic acid, and pantothenic acid. Neutral salts are obtained by reaction of the corresponding acid with the free base, which is obtained by extraction of an aqueous solution of the hydrochloride at pH 8.6 with organic water-immiscible solvents, such as butanol and chloroform. By evaporation of the organic solvent, the antibiotic adriamycin is obtained in the form of free base. The salts may be also obtained by double exchange of the salts, for example, adriamycin pantothenate is obtained from adiamycin sulphate with calcium pantothenate. Although the antibiotic adriamycin has a remarkable bacteriostatic activity against several microorganisms (see Table 3), it has proved particularly useful as an antitumoral.

TABLE 3
Antibiotic activity of adriamycin hydrochloride

| Strains | Medium | DIM µg./ml. |
|---|---|---|
| Staph. aureus cp. 209 P | Meat broth | 12.5 |
| B. subtillis | do | 6.25 |
| S. faecalis | do | 50 |
| S. abortivo equina | do | 50 |
| S. coli B | do | 3 |
| Sh. flexneri | do | >50 |
| C. albicans | Sabouraud | >50 |

The antibiotic shows a marked inhibitory effect on tumor growth in ascitic form, in which an immediate contact of the antibiotic and the neoplastic cells is achieved. A good inhibiting effect is observed also in solid tumors where the activity is different according to the administration route and to the dose. The antitumoral activity of adriamycin gives better results in efficacy and duration than daunomycin also in these tests.

PHARMACOLOGY

Study of the antitumoral activity of the antibiotic adriamycin

The study of the antitumoral activity of the antibiotic adriamycin obtained from Streptomyces F.I. 106 has been carried out on some mouse and rat tumors both in the solid and ascitic form.

(1) Ascitic tumors.—Activity tests have been carried out on mice bearing Ehrlich ascitic carcinoma and treated intraperitoneously with solutions of the antibiotic, at different concentrations, for 5 consecutive days starting from the same day following the tumor implantation. Table 4, where the obtained results are summarized, shows that the antibiotic under examination, administered in equal doses of 1.75 and 2.50 mg./kg./day, has a remarkable inhibitory effect on the ascitic tumor growth and has increased considerably the average survival rate of the treated animals.

TABLE 4
Ehrlich ascitic carcinoma

| Lots of 10 animals | Dose, mg./kg./day | Body weight change, grams (days after implantation) | | Average survival time, |
|---|---|---|---|---|
| | | 6 | 12 | |
| Controls | | +7.5 | +13.9 | 14 |
| Adriamycin | 1.75 | −0.5 | +3.8 | 33.8 |
| | 2.50 | −1.8 | +0.9 | 34.6 |

The results have been confirmed by a successive experiment in which the antibiotic has been administered at the doses of 1.25 and 2.50 mg./kg./day (Table 5).

TABLE 5
Ehrlich ascitic carcinoma

| Lots of 10 animals | Dose, mg./kg./day | Body weight change, grams (days after implantation) | | Average survival time, days |
|---|---|---|---|---|
| | | 6 | 12 | |
| Controls | | +7.5 | +13.2 | 17.8 |
| Adriamycin | 1.25 | −0.6 | +4.6 | 31.8 |
| | 2.50 | −0.9 | −4.3 | 51.2 |

A comparison of the results obtained, under the same experimental conditions, on mice bearing Ehrlich ascitic carcinoma, with the antibiotics daunomycin and adriamycin in respect to control mice shows that the latter is a more active product. From Table 6, it is seen that the values of the ratio indicating the increase of the survival time in the treated mice as compared to the control mice for the same doses are higher with adriamycin.

TABLE 6

Ratio of the average survival time of mice bearing Ehrlich ascitic carcinoma (each value shows the average of the obtained results in groups of 10 animals per group)

Dose, mg./kg./day _____ 2.50
Daunomycin _____ 1.8
Adriamycin _____ 2.8

The antimitotic effect of adriamycin has been shown in tests carried out on mice bearing ascitic tumors in logarithmic growth stage (5th day). These animals have been treated intraperitoneously with only one administration of adriamycin of 2 mg./kg. The examination of the smears of the neoplastic exudate drawn before and at different intervals of time after the treatment (2, 4, 8, 24, 32 and 48 hours) shows that the antibiotic causes a very quick and complete stopping the multiplicative activity of the tumor which lasts until the 32nd hour. 48 hours after the treatment, numerous cells are noticed in mitosis, but their morphology is constantly altered.

(2) Solid tumors.—The test of activity on solid tumors have been carried out with sarcoma 180 in the mouse and with Oberling-Guérin-Guérin myeloma in the rat.

(a) Sarcoma 180: mice grafted with a fragment of neoplastic tissue have been treated by subcutaneous route, for 8 days, starting from the day following the tumor implantation. The antibiotic has been administered in solution at different concentrations, corresponding to following doses in mg./kg./day: 7, 5, 3.5, 2.5 and 1.75. At the 11th day, all the animals have been slaughtered and their tumors removed and weighed. The results are reported in Tables 7 and 8.

TABLE 7

| Lot | Dose, mg./kg./day | Body weight change, g. | | Tumor weight, g. | Percent inhibition | Mortality |
|---|---|---|---|---|---|---|
| | | Gross | Net | | | |
| Controls | | +4.78 | +0.86 | 3.922 | | 0/10 |
| Adriamycin | 7 | −5.98 | −6.22 | 0.239 | 93.9 | 6/10 |
| | 3.50 | −2.31 | −3.01 | 0.696 | 82.3 | 0/10 |
| | 1.75 | +3.09 | +1.10 | 1.988 | 49.3 | 0/10 |

TABLE 8
Sarcoma 180

| Lot | Dose, mg./kg./day | Body weight change, g. | | Tumor weight, g. | Percent inhibition | Mortality |
|---|---|---|---|---|---|---|
| | | Gross | Net | | | |
| Controls | | +5.65 | +3.19 | 2.461 | | 0/10 |
| Adriamycin | 5 | −4.37 | +4.61 | 0.239 | 90.3 | 0/10 |
| | 2.50 | −1.60 | −2.26 | 0.656 | 73.4 | 0/10 |
| Daunomycin | 5 | +0.85 | −0.18 | 1.029 | 58.2 | 0/10 |
| | 2.50 | +1.52 | −0.23 | 1.745 | 29.1 | 0/10 |

From the 2 tables, it is seen that the antibiotic has caused a marked inhibition of the tumor growth at all doses used. A notable mortality of the treated animals has been verified only with a higher dosage (7 mg./kg./day). Tests carried out in parallel, under the same experimental conditions, with the antibiotic daunomycin (see Table 8) have made it possible to draw dose-effect graphs of the two products and to carry out a comparison of the activity. It is clearly seen that under the same experimental conditions, adriamycin has a higher activity than daunomycin on this kind of tumor. The result is even more evident, if the inhibiting doses 50 (ID50) are considered:

Mg./kg.
Daunomycin _____ About 3.3
Adriamycin _____ About 1.5

Tests of subacute toxicity carried out on healthy mice with adriamycin administered by subcutaneous route, for 8 days, at does variable from 10 to 1.25 mg./kg. gave the following results.

TABLE 9
Subacute toxicity of the adriamycin on mouse

| Dose, mg./kg./day | Percent mortality in days | |
|---|---|---|
| | 10th | 15th |
| 10 | 100 | 100 |
| 8.33 | 70 | 100 |
| 6.67 | 40 | 80 |
| 5 | 0 | 0 |
| 2.50 | 0 | 0 |
| 1.25 | 0 | 0 |

From the above data, it is calculated graphically that the lethal dose 10 ($LD_{10}$) is equal to 6.4 mg./kg. From the diagram, one can also deduce that the inhibition dose 90 ($ID_{90}$) of adriamycin is 5 mg./kg. With these data it is possible to calculate, according to Skipper (Cancer Chemotherapy Report, 17, 1, 1962), the therapeutical index of adriamycin, which is $$T.I. = \frac{LD_{10}}{ID_{90}} = \frac{6.4}{5} = 1.28$$

Under the same experimental conditions, the therapeutical index of daunomycin is 0.67. It is useful to note that from the above-mentioned work of Skipper, under the same experimental conditions, the therapeutical index of other antitumoral antibiotics already in use (actinomycin, mitomycin, actinobolin, actidione) is lower than 1.

(b) Oberling-Guérin-Guérin myeloma: Wistar rats grafted with a fragment of tumor tissue have been treated by intravenous route for 8 days, starting from the day following the tumor implantation. At the 12th day of the experiment the surviving animals had been destroyed and the tumors were removed and weighed. Table 10 shows the antibiotic to be effective also against this type of tumor. Under these experimental conditions the $ID_{50}$ of the adriamycin is about 2 mg./kg.

TABLE 10

Oberling-Guérin-Guérin myeloma

| Lot | Dose, mg./kg./day | Body weight change, grams | | Mortality | Tumor weight, g. | Percent inhibition |
|---|---|---|---|---|---|---|
| | | Gross | Net | | | |
| Controls | | +15.7 | +3.3 | 0/10 | 12.447 | |
| Adriamycin | 0.625 | +9.2 | −1.0 | 3/10 | 10.253 | 17.7 |
| | 1.25 | +25.2 | +14.6 | 0/10 | 10.649 | 14.5 |
| | 2.50 | −1.3 | −5.6 | 1/10 | 4.295 | 65.5 |

The following examples serve to illustrate the invention without limiting it.

EXAMPLE 1

Two 300 ml. Erlenmeyer flasks, each containing 60 ml. of the following culture medium for the vegetative phase, were prepared: peptone 0.6%; dry yeast 0.3%; hydrated calcium carbonate 0.2%; magnesium sulphate 0.01%; after sterilization was 7.2. Sterilization has been effected by heating in autoclave to 120° C. for 20 minutes. Each flask was inoculated with a quantity of mycelium of the mutant F.I. 106 corresponding to ⅕ of a suspension in sterile water of the mycelium of a 10-days old culture grown in a big test tube on the following medium: saccharose 2%; dry yeast 0.1%; bipotassium phosphate 0.2%; sodium nitrate 0.2%; magnesium sulphate 0.2%; agar 2%; tap water up to 100%. The flasks were then incubated at 28° C. for 48 hours on a rotary shaker with a stroke of 30 mm. at 220 r.p.m. 2 ml. of a vegatative medium thus grown were used to inoculate 300-ml. Erlenmeyer flasks with 60 ml. of the following medium for the productive phase: glucose 6%; dry yeast 2.5%; sodium chloride 0.2%; bipotassium phosphate 0.1%; calcium carbonate 0.2%; magnesium sulphate 0.01, ferrous sulphate 0.001%; zinc sulphate 0.001%; copper sulphate 0.001%; tap water to 100%. The glucose was previously sterilized separately at 110° C. for 20 minutes. The resulting pH was 7. This was sterilized at 120° C. for 20 minutes and incubated at 28° C. under the same conditions of stirring, as for the vegetative media. The maximum concentration of the antibiotic was reached on the 6th day of fermentation. The quantity of adriamycin produced at this time corresponds to a concentration of 15 µg./ml.

EXAMPLE 2

The operation was as in Example 1 with the difference that the inoculation culture was grown on the following solid medium: 200 g. of peeled potatoes were boiled for 20 minutes in 500 ml. of water. The volume was brought up to its original value and filtered through gauze. 2% of glucose, 0.1% of Difco yeast extract and 2% of agar were added. The volume was brought to 1000 ml. The resulting mixture was sterilized at 120° C. for 20 minutes and pH 6.8–7.0. The maximum concentration of adriamycin 12 µg./ml. was reached at the 140th hour.

EXAMPLE 3

The operation was as in Example 2 with the difference that the vegetative and productive media had the following compositions:

Vegetative medium.—Starch 3%; calcium carbonate 0.4%; distillers solubles 0.3%; ammonium sulphate 0.1%; casein 0.5%; bipotassium phosphate 0.01; in tap water up to 100%. The pH, after sterilization in an autoclave at 120° C. for 20 minutes, was 7.

Productive medium.—Starch 5%; calcium carbonate 0.8%; corn steep liquor 0.6%; casein 0.5%; ammonium sulphate 0.1%; bipotassium phosphate 0.01%. The pH after sterilization, carried out as for the vegetative phase, was 7. The maximum production was achieved at the 7th day with 6.5 µg./ml.

EXAMPLE 4

A culture of the mutant F.I. 106 on a solid medium as in Example 2 was inoculated into 500 ml. of the liquid medium of the vegetative phase in Example 1, contained in a 2000 ml. Pyrex glass flask. The resulting mixture was incubated at 28° C. for 48 hours on a rotary shaker with a stroke of 3.5 mm. at 120 r.p.m. 100 ml. of the culture broth so obtained was then inoculated in 3000 ml. of the same liquid medium contained in a 5-liter neutral glass fermenter, provided with a screw-stirrer, an inlet tube for bubbling in air ending under the screw-stirrer, a breakwater device, a tube for inoculation, an air outlet tube, temperature checking equipment and a device for intermittent or continuous additions under sterile conditions. Growth was carried out at 28° C. with an aeration rate of 3 liters per minute and under stirring at a rate of 400 r.p.m. After 24 hours, 300 ml. of the broth culture thus grown were inoculated into 6 liters of the productive medium in Example 1 contained in a 10-liter neutral glass fermenter as described above. Fermentation was carried out at a stirring rate of 350 r.p.m. and with an aeration rate of 5 liters per minute, foaming being checked by adding small quantities of silicone antifoaming agent. The highest production obtained in 150 hours of fermentation corresponded to a 6 µg./ml. concentration of adriamycin.

EXAMPLE 5

With a culture obtained as in Example 1, a 2000-ml. flask was inoculated with 500 ml. of medium of the following composition: peptone 0.6%; granulated dry yeast 0.5%; calcium nitrate 0.05%, in tap water to 100%. The medium was stirred on a rotary shaker for 48 hours at 28° C. By means of the culture thus obtained, an 80-liter fermenter was inoculated with 50 liters of the medium. This medium was stirred at 230 r.p.m. and aerated with an airflow of 0.7 liter/liter of the medium/minute at 27° C. After 4–5 hours, the culture broth was used to sow 500 liters of culture medium in an about 800-liter fermenter. The fermentation medium has the following composition: glucose 7%; chick-pea meal 6.65%; calcium carbonate 0.2%; sodium chloride 0.2%; bipotassium phosphate 0.1%; magnesium sulphate heptahydrate 0.02%; ferrous sulphate heptahydrate 0.00068%; manganese sulphate heptahydrate 0.001%; copper sulphate 0.002%; in tap water to 100%. The medium was sterilized at 120° C. for 30 minutes, cooled to 27° C. and after inoculation, stirred at 250 r.p.m. and aerated with an air flow of 0.4 liter/liter of medium/minute. After 145 hours, the culture broth contained 6.5 µg./ml. of adriamycin.

EXAMPLE 6

60 liters of culture liquid, resulting from the fermentation obtained according to Example 4, were filtered from the mycelium through Supercel to yield a cake and a filtrate which were extracted separately. The cake was suspended in acetone diluted with 0.1 N aqueous sulphuric acid (4:1) and stirred for 2 hours. The liquid was filtered off and the cake was further stirred twice. The extracts obtained were combined, neutralized and the acetone was evaporated off in vacuo. The concentrate, which contains about 0.25 g. of adriamycin, was acidified to pH 3 with 1 N hydrochloric acid, and then extracted with chloroform which removed part of the impurities. The aqueous phase was adjusted to pH 8.6 with 1 N sodium hydroxide and then extracted with a chloroform-methanol (9:1) mixture. The operation was repeated until the aqueous phase became colorless. The methanol-chloroform extracts were washed with water at pH 8.6, then dried over anhydrous sodium sulphate, filtered and concentrated to a small volume under reduced pressure. Adriamycin in the form of free base precipitated upon addition of ethyl ether. 1.50 g. of crude product was obtained which contained about 0.2 g. of adriamycin. The filtered broth was adjusted to pH 8.6 with 1 N sodium hydroxide and extracted with a chloroform-methanol (9:1) mixture. The operation was repeated twice. The methanol-chloroform extracts were washed with water at pH 8.6 and re-extracted with 0.01 N hydrochloric acid until the aqueous phase assumed a red color. The chloroform phase was removed. The aqueous phase was filtered, adjusted to pH 8.6 with 1 N sodium hydroxide, and extracted with a chloroform-methanol (9:1) mixture. The extract, which at this point contained besides various impurities, 0.15 g. of adriamycin, was washed with water at pH 8.6, dried over anhydrous sodium sulphate, filtered and concentrated under reduced pressure to a small volume. By adding 10 volumes of ethyl ether, precipitation of 1.00 g. of a crude product containing 0.12 g. of adriamycin was obtained. In total 0.320 g. of adriamycin in the form of crude base were obtained.

EXAMPLE 7

0.500 g. of crude product containing about 15% of adriamycin were dissolved in 10 cc. of M/15 buffer phosphate at pH 5.4. The solution was adsorbed on 10 g. of cellulose powder (whatman CF 11). The mixture was dried overnight in vacuo over anhydrous calcium chloride, put in a glass chromatographic column (100 cm. high and 4 cm. in diameter) containing 225 g. of cellulose powder (whatman CF 11) previously buffered with M/15 buffer phosphate at pH 5.4, and dried in vacuo over anhydrous calcium chloride. Elution was effected with a propanol-ethyl acetate-water (7:1:2) mixture and 25 ml. fractions were collected with an automatic collector. The various fractions were examined by chromatography over whatman paper No. 1, buffered at pH 5.4, using as eluting agent the same mixture as was employed to elute the column. Fractions 40-60 contain adriamycin and were combined and concentrated to 50 ml. Salts were precipitated and filtered off. 200 ml. of water were added to the filtrate and the pH of the solution was adjusted to 7 with 1 N sodium hydroxide. The resulting solution was concentrated under reduced pressure to 50 ml. The concentrate was adjusted to pH 8.6 and extracted with chloroform. The extraction was repeated three times. The chloroform extracts were then combined and washed with water adjusted to pH 8.6, and then with water. They were dehydrated over anhydrous sodium sulphate, filtered and the filtrate was concentrated under reduced pressure to 5 ml. 0.15 ml. of a 1 N solution of anhydrous hydrochloric acid in methanol were added and cooled. After a few minutes, a crystalline precipitate of adriamycin hydrochloride was formed. This was filtered off and washed with cold chloroform and anhydrous ethyl ether. 50 mg. of the product were obtained which was recrystallized from ethanol. In this manner 35 mg. of a pure product melting at 204-205° C. are obtained. From the mother liquor, a further 15 mg. of an amorphous product of 90% purity were recovered.

EXAMPLE 8

0.077 g. adriamycin hydrochloride were dissolved in 4 ml. of 0.5 N hydrochloric acid and heated for 1 hour at 100° C. A dark red amorphous precipitate was obtained which was collected by filtration after cooling. The product, washed with water to neutrality of the washings, was dried overnight in vacuo over potassium hydroxide and for 6 hours over phosphoric anhydride at 56° C. Thus 47 mg. of aglycone of adriamycin are obtained melting at 223°-224° C., $[\alpha]_D = +156°$ (dioxane) having the formula $C_{21}H_{18}O_9$. After precipitation of the aglycone, the almost colorless aqueous acid solution contains a compound which reduces Fehling's solution and gives a positive reaction with ninhydrin. The solution was neutralized (pH 6), passing through a Dowex exchange resin 1x8 (in bicarbonate form). The resin was filtered and the filtrate lyophilized. The white residue consists of an aminosugar which has the same properties as daunosamine hydrochloride. By paper chromatography with the mixed solvents: butanol-acetic acid-water (4:1:1) and (4:1:5); butanol-pyridine-water (6:4:3), and by thin layer Alusil chromatography using as solvent a propanol-ethyl acetate-water-25% aqueous ammonia (6:1:3:1) mixture, the amino-sugar did not separate from daunosamine. The product may be revealed with the ninhydrin reagent and with aniline phthalates over paper and with anisaldehyde and sulphuric acid on thin layers.

We claim:
1. A new antibiotic selected from the group consisting of adriamycin, having the formula:

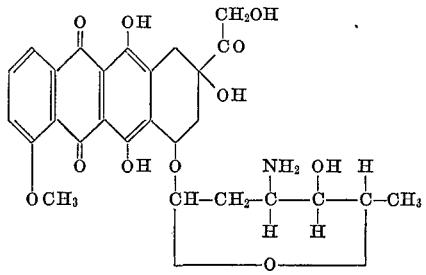

its aglycone and its non-toxic pharmaceutically acceptable organic and inorganic acid salts.

2. The compound adriamycin having the formula

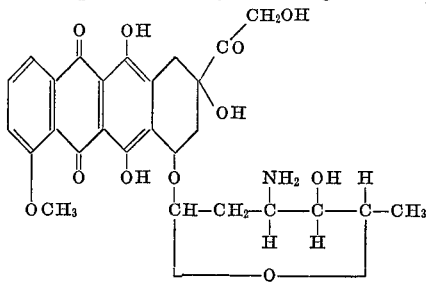

3. The pharmaceutically acceptable acid addition salts of the compound of claim 2.
4. The hydrochloride of the compound of claim 2.
5. The sulphate of the compound of claim 2.
6. The pantothenate of the compound of claim 2.
7. The aglycone of the compound of claim 2.

References Cited

UNITED STATES PATENTS 2,736,725 2/1956 Ritter _____ 260—210AB
3,296,246 1/1967 Ores et al. _____ 260—210AB LEWIS GOTTS, Primary Examiner J. R. BROWN, Assistant Examiner U.S. Cl. X.R.

195—80; 260—396; 424—180